United States Patent Office 3,234,201
Patented Feb. 8, 1966

3,234,201
OCTADECAPEPTIDES AND DERIVATIVES THEREOF
Robert Schwyzer and Beat Iselin, Riehen, Heini Kappeler, Birsfelden, Werner Rittel, Basel, and Herbert Zuber, Riehen, Switzerland, assignors to Ciba Corporation, a corporation of Delaware
No Drawing. Filed May 5, 1960, Ser. No. 26,956
Claims priority, application Switzerland, May 28, 1959, 73,685/59
11 Claims. (Cl. 260—112.5)

This invention provides a new octadecapeptide of the formula L-asparaginyl-L-seryl-glycyl-L-prolyl-L-tyrosyl-L-lysyl - L - methionyl - L - glutaminyl-L-histidyl-L-phenylalanyl - L - arginyl-L-tryptophyl-glycyl-L-seryl-L-prolyl-L-prolyl-L-lysyl-L-asparaginic acid and also the corresponding compound which contains, instead of the glutaminyl radical, the radical of glutamic acid, and derivatives and acid addition salts thereof.

The new compounds possess the action of the natural hypophysis hormone β-MSH that stimulates melanocytes, but as compared with the latter hormone the compounds of this invention have the advantage that they can be synthesized more easily. The new octadecapeptides can be used, instead of natural MSH, as a medicament or intermediate product for the manufacture of β-MSH. The new octadecapeptides are obtained by the aforementioned methods in themselves known for making peptides, the amino-acids being linked together in the indicated sequence or linked together after forming small peptide units. Thus, one of the amino-acid or peptide molecules in the form of an ester may be linked with a further amino-acid or peptide molecule which contains a protected amino group, in the presence of a condensing agent, such as a carbodiimide or a phosphorous acid halide, or there may be reacted with the amino-acid or peptide ester having a free amino group an amino-acid or peptide having an activated carboxyl group (and a protected amino group), for example, an acid halide, azide, anhydride or imidazolide or an activated ester, such as cyanomethyl ester or carboxymethyl thio ester. Conversely, an amino-acid or a peptide having a free carboxyl group (and a protected amino group) may be reacted with an amino-acid or a peptide having an activated amino group (and a protected carboxyl group), for example, a phosphitamide. All the above methods are useful for forming peptide bonds in the process of this invention. But especially advantageous methods are given in the examples below.

The new octadecapeptides are prepared by linking together successively individual amino acids or small peptide units. Advantageously they are obtained by linking the heptapeptide L-asparaginyl-L-seryl-glycyl-L-prolyl-L-tyrosyl - L - lysyl - L-methionine having protected amino groups or a reactive derivative thereof with the undecapeptide L-glutaminyl-L-histidyl-L-phenylalanyl-L-arginyl-L - tryptophyl - glycyl-L-seryl-L-prolyl-L-prolyl-L-lysyl-L-asparaginic acid, of which the carboxyl groups are functionally converted and of which the ε-amino group of the lysyl radical is protected, or a corresponding compound which contains the radical of glutamic acid instead of the glutaminyl radical, or a reactive functional derivative thereof, to form a peptide bond between the L-methionyl and the L-glutaminyl and L-glutamyl radicals, respectively.

The peptide bond is advantageously made in the presence of a carbodiimide as a condensing agent.

In the starting materials free functional groups that are not to take part in the reaction are advantageously protected, especially by a radical that can easily be split off by hydrolysis or reduction, carboxyl groups advantageously being protected by esterification, for example with lower alkanols, such as methanol, ethanol, propanol, butanol, or benzyl alcohol, para-nitrobenzyl alcohol, or by amidation, amino groups being protected, for example, by the introduction of the tosyl, or trityl radical or especially by the carbobenzoxy group or a colored protective group, such as the para-phenylazo-benzyloxycarbonyl group and the para-(para'-methoxy-phenylazo)-benzyloxy-carbonyl group. For protecting the ε-amino group of the lysyl radical there is advantageously used the tosyl radical.

The conversion of a protected —NH₂ group into a free amino group and also the conversion of a functionally converted carboxyl group into a free carboxyl group may be carried out by a method in itself known by treatment with a hydrolyzing or reducing agent.

The heptapeptides and undecapeptides and derivatives thereof used as starting materials are obtained by the aforementioned methods in themselves known for making peptides.

The undecapeptide L-glutaminyl-L-histidyl-L-phenylalanyl - L - arginyl-L-tryptophyl-glycyl-L-seryl-L-prolyl-L-prolyl-L-lysyl-L-asparaginic acid or the corresponding compound which contains the radical of glutamic acid instead of the glutaminyl radical, possesses a good MSH-activity and is therefore useful as a medicament.

Depending on the procedure used the new compounds are obtained in the form of free bases or salts thereof. From the salts the bases can be obtained by methods in themselves known. From the bases salts can be made by reaction with acids suitable for the formation of therapeutically useful salts, for example, those of inorganic acids, such as hydrohalic acids, for example, hydrochloric acid or hydrobromic acid, nitric acid, thiocyanic acid, sulfuric acid, phosphoric acid, or an organic acid, such as acetic acid, propionic acid, glycollic acid, lactic acid, pyroracemic acid, oxalic acid, malonic acid, succinic acid, maleic acid, fumaric acid, tartaric acid, citric acid, benzoic acid, cinnamic acid, salicylic acid, 2-phenoxy- or 2-acetoxy-benzoic acid, mandelic acid, methane sulfonic acid, ethane sulfonic acid, hydroxyethane sulfonic acid or benzene or toluene sulfonic acid.

The octadecapeptides of this invention can be used in the form of pharmaceutical preparations. These preparations contain the peptide in admixture with a pharmaceutical organic or inorganic carrier suitable for enteral or parenteral administration. For making the carriers there are used substances that do not react with the polypeptides, for example, gelatine, lactose, glucose, sodium chloride, starches, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets, dragees, powders, salves, creams, suppositories, or in liquid form, as solutions, suspensions or emulsions. If desired they may be sterilized and/or may contain auxiliary substances, such as preserving, stabilizing, wetting or emulsifying agents. They may also contain other therapeutically valuable substances.

The following examples illustrate the invention:

EXAMPLE 1

*Carbobenzoxy-glycine-para-nitrobenzyl ester*

A solution of 105 grams (0.5 mol) of carbobenzoxy-glycine, 103 grams (0.5 mol) of para-nitrobenzyl chloride and 85 ml. (0.6 mol) of triethylamine in 1000 ml. of ethyl acetate is heated under reflux for 15 hours, then cooled, and filtered to remove precipitated triethylamine hydrochloride. The filtrate is washed with 2 N-solution of sodium carbonate and water, while cooling with ice, then dried and evaporated in vacuo to a volume of about 300 ml., during which the reaction product separates in crystalline form. A second fraction is obtained by further concentrating the mother liquor and adding ether to yield a total of 146 grams. After recrystallization from alcohol 139 grams (81%) of the product are obtained melting at 108–110° C.

EXAMPLE 2

Glycine-para-nitrobenzyl ester 103 grams (0.3 mol) of carbobenzoxy-glycine-para-nitrobenzyl ester (see Example 1) are dissolved in 600 ml. of hot glacial acetic acid and 215 ml. of a 4.2 N-solution of hydrogen bromide in glacial acetic acid (0.9 mol) are added at 10–15° C. Upon allowing the mixture to stand at room temperature the crystalline hydrobromide of glycine para-nitrobenzyl ester separates out, and after 2 hours it is filtered off and the crystallizate is washed with glacial acetic acid and alcohol. The yield amounts to 80.5 grams (92%) melting at 197–200° C. The product is recrystallized from methanol and then melts at 202–205° C.

In order to convert it into the free ester 58 grams (0.2 mol) of the hydrobromide are dissolved in 100 ml. of water, then covered with 300 ml. of ethyl acetate, and 50 ml. of a cold saturated solution of potassium carbonate are added at 0° C. while shaking. The ethyl acetate phase is separated off, and the aqueous solution, after being saturated with solid potassium carbonate, is extracted twice with ethyl acetate. The united ethyl acetate phases are dried and, after being cautiously evaporated in vacuo at room temperature, yield 36.4 grams (87%) of glycine para-nitrobenzyl ester in the form of a crystalline residue melting at 50–52° C., which can be further worked up directly. After being recrystallized twice from a large quantity of ether the melting point does not change and the product is analytically pure.

EXAMPLE 3

Carbobenzoxy-L-seryl-glycine-para-nitrobenzyl ester 12 grams (0.05 mol) of carbobenzoxy-L-serine and 10.5 grams (0.05 mol) of glycine-para-nitrobenzyl ester (see Example 2) are dissolved in 120 ml. of methylene chloride and cooled to 0° C., whereupon a salt-like complex of the two reaction components rapidly separates out (this reaction takes place more intensely when acetonitrile is used as solvent and somewhat more slowly in dimethyl-formamide). To the mixture is added a solution of 11.3 grams (0.055 mol) of dicyclohexyl-carbodiimide in 20 ml. of methylene chloride and the whole is agitated overnight at 0° C. The salt gradually dissolves, and at the same time a mixture of the reaction product and dicyclohexyl-urea separate out, and these compounds are filtered off after the addition of 0.5 ml. of glacial acetic acid (to destroy the excess of carbodiimide), and the filter residue is washed with methylene chloride. In order to separate the dicyclohexyl-urea the material is stirred with 150 ml. of tetrahydrofurane, the undissolved urea is filtered off, and the filtrate is evaporated in vacuo. By adding ethyl acetate to the residue the reaction product crystallizes and, after being allowed to stand overnight at 0° C., is filtered off. After recrystallization from ethanol there are obtained 15.0 grams (70%) of pure material melting at 121–123° C., and having the specific rotation $$[\alpha]_D^{30} = -8.5°$$

(c.=2.01 in glacial acetic acid). The mother liquor is only an amorphous partially racemized product.

By carrying out the reaction in dimethyl-formamide there is obtained as a by-product about 15% of carbobenzoxy-L-seryl-N:N'-dicyclohexyl-urea melting at 170–171° C. (after recrystallization from methanol) which can only be separated with difficulty from the main product.

In order to examine the optical purity of the product a test portion of the carbobenzoxy-L-seryl-glycine para-nitrobenzyl ester is hydrogenated in the present of palladium-charcoal. The L-seryl-glycine, obtained when the calculated quantity of hydrogen (5-equivalents) has been absorbed has the specific rotation $[\alpha]_D^{26} = +31.3°$ (c.=3.17 in 1 N-hydrochloric acid).

EXAMPLE 4

L-seryl-glycine-para-nitrobenzyl ester

To a solution of 43.1 grams (0.1 mol) of carbobenzoxy-L-seryl-glycine para-nitrobenzyl ester (see Example 3) in 100 ml. of ethyl acetate are added 200 ml. of a 2 N-solution of hydrogen bromide in ethyl acetate freshly prepared at 0° C. After about 10 minutes crystals begin to separate, after 2 hours the solvent is decanted off, the crystalline material is washed with ethyl acetate, filtered and dried in vacuo. The crude hydrobromide, amounting to 30.0 grams (79%), melts at about 140° C. and is sufficiently pure for the further conversion into the free dipeptide ester.

By recrystallization from alcohol analytically pure material melting at 148–150° C. is obtained having the specific rotation $[\alpha]_D^{27} = +12°$ (c.=2.02 in water).

The reaction can also be carried out with hydrogen bromide in dioxane, but in this case the hydrobromide does not crystallize from the reaction solution and is therefore more difficult to isolate. When hydrogen bromide in glacial acetic acid or nitromethane is used only oily material is obtained.

In order to form the free ester 29.0 grams (0.077 mol) of the hydrobromide are suspended in 450 ml. of dry chloroform, and 40 mol of a 2.5 N-solution of ammonia in methanol (about 1.3 equivalents) are added at 0° C. By stirring the mixture at 0° C. the starting material rapidly dissolves with the separation of ammonium bromide. After 15 minutes the mixture is filtered, the solvent is distilled off in vauco at room temperature, and the crystalline residue is washed with cold ethyl acetate and ether. The crude ester, 16.9 grams (74%) melts at about 85° C. and can be used directly for further reactions.

By recrystallization twice from acetonitrile the analytically pure dipeptide ester melting at 94–96° C. is obtained.

EXAMPLE 5

Carbobenzoxy-L-asparaginyl-L-seryl-glycine-para-nitrobenzyl ester 26.6 grams (0.1 mol) of carbobenzoxy-L-asparagine and 19.3 grams (0.065 mol) of freshly prepared L-seryl-glycine para-nitrobenzyl ester (see Example 4) are dissolved in 100 ml. of dimethyl-formamide, and a precooled solution of 20.6 grams (0.1 mol) of dicyclohexyl-carbodiimide in 200 ml. of acetonitrile are added at −10° C. while stirring. To the reaction mixture there are added in the course of 10 minutes a further 300 ml. of cold acetonitrile, and the whole is stirred for one hour at −10° C. and overnight at 0° C. After the addition of 0.5 ml. of glacial acetic acid the mixture of amorphous reaction product and dicyclohexyl-urea that separates out is filtered off, washed with a mixture of dimethyl-formamide and acetonitrile (1:5), acetonitrile and ether and dried in vacuo. In order to separate any starting material that may be present the finely pulverized mixture is stirred with 1 N-hydrochloric acid and then with a cold 1 N-solution of sodium bicarbonate, filtered, and the filter residue is washed with water and cold alcohol. The dry material is stirred with 100 ml. of dimethyl-formamide, the undissolved dicyclohexyl-urea is filtered off, washed with dimethyl-formamide, and the filtrate is evaporated in vacuo to about 50 ml. Upon the addition of 150 ml. of hot methanol the product crystallizes in the form of fine needles melting at 210–212° C., and having the specific rotation $[\alpha]_D^{27} = -12.2°$ (c.=2.38 in glacial acetic acid). The yield amounts to 15.8 grams (45%).

EXAMPLE 6

*Carbobenzoxy-L-asparaginyl-L-seryl-glycine*

To a suspension of 8.2 grams (15 mmol) of carbobenzoxy-L-asparaginyl-L-seryl-glycine-para-nitrobenzyl ester (see Example 5) in 75 ml. of dioxane are added dropwise, while stirring, in the course of 30 minutes, 36 ml. of a 0.5 N-solution of sodium hydroxide (pH-value=11–11.2). After a further 15 minutes the clear solution is adjusted to a pH value of 7 with 1 N-hydrochloric acid and evaporated to about 10 ml. in vacuo. The crystalline material that separates out is dissolved by the addition of 20 ml. of water, and the solution is extracted twice with ethyl acetate to remove para-nitrobenzyl alcohol, and then acidified at 40° C. with 15 ml. of 2 N-hydrochloric acid. By cooling rapidly the reaction product separates out in the form of melted needles, which are filtered off after one hour at 0° C., and the filter residue is washed with cold water until the washings are neutral (5.0 grams melting at 176–178° C.). After recrystallization from water 4.1 grams (67%) of a product are obtained which melts at 185–186° C. $[\alpha]_D^{20}=8.4°$ (c.=1.90 in glacial acetic acid).

EXAMPLE 7

*Carbobenzoxy-L-prolyl-L-tyrosine-methyl ester*

To a solution of 100 grams (0.4 mol) of carbobenzoxy-L-proline and 78 grams of tyrosine methyl ester in 1000 ml. of methylene chloride are added at 0° C. 86.5 grams (0.42 mol) of dicyclohexylcarbodiimide, and the whole is allowed to stand overnight at 0° C. After the addition of 3 ml. of glacial acetic acid the precipitated dicyclohexyl-urea is filtered off, and the filtrate is washed, while cooling, with 1 N-hydrochloric acid, a 1 N-solution of sodium bicarbonate and water, then dried and evaporated. The residue, upon the addition of ethyl acetate, yields 160 grams (91%) of crystalline material melting at 72–74° C. After recrystallizing the product twice from a mixture of acetone and ether, an analytically pure material is obtained of which the melting point has not changed. It has the optical rotation $[\alpha]_D^{27}=-24°$ (c.=4.08 in alcohol).

EXAMPLE 8

*Carbobenzoxy-L-prolyl-L-tyrosine*

149 grams (0.35 mol) of carbobenzoxy-L-prolyl-L-tyrosine methyl ester (see Example 7) are dissolved in 750 ml. of methanol, the solution is cooled to 0° C., and 900 ml. of a precooled 1 N-solution of sodium hydroxide are added. The solution is allowed to stand for 2 hours at 0° C., and adjusted to a pH value of 7 with 2 N-hydrochloric acid, methanol is liberated in vacuo, and the remainder is acidified at 0° C. with 2 N-hydrochloric acid. The oily material which separates out is taken up in ethyl acetate, extracted with 1 N-solution of sodium bicarbonate, and precipitated from the aqueous alkaline solution in the form of an oil by the addition of 2 N-hydrochloric acid at 0° C., and is then taken up in ethyl acetate. The dried ethyl acetate solution is concentrated in vacuo to yield 135 grams (94%) of the product in the form of a colorless foam which can be used directly for the further reactions.

EXAMPLE 9

*Carbobenzoxy-L-prolyl-L-tyrosyl-L-ε-tosyl-lysine methyl ester*

To a solution of 135 grams (0.33 mol) of carbobenzoxy-L-prolyl-L-tyrosine (see Example 8) and 109 grams (0.35 mol) of L-ε-tosyl-lysine-methyl ester in 1000 ml. of acetone are added at 0° C. 72 grams (0.35 mol) of dicyclohexyl-carbodiimide. The whole is allowed to stand overnight at 0° C. and, after the addition of 2.5 ml. of glacial acetic acid, the precipitated dicyclohexyl-urea is filtered off. The filtrate is evaporated in vacuo, the residue is taken up in 1000 ml. of ethyl acetate, the solution is washed, while cooling, with 1 N-hydrochloric acid, 1 N-solution of sodium bicarbonate and water, and evaporated in vacuo to about 500 ml. Upon allowing the whole to stand at 0° C. the reaction product separates out slowly in an amorphous form (163 grams melting at 131–133° C.). By recrystallization from methanol there are obtained 139.5 grams (60%) of finely crystalline material melting at 134–136° C. and having the specific rotation $[\alpha]_D^{28}=-47°$ (c.=4.01 in alcohol).

Acetylation with acetic anhydride in pyridine yields carbobenzoxy - L - prolyl - L - O-acetyltyrosyl-L-ε-tosyl-lysine-methyl ester melting at 109–111° C. (after recrystallization from ethyl acetate). It has the specific rotation $[\alpha]_D^{28}=-42.3°$ (c.=1.80 in ethanol).

EXAMPLE 10

*Carbobenzoxy-L-prolyl-L-tyrosyl-L-ε-tosyl-L-lysine*

7.1 grams (10 millimols) of carbobenzoxy-L-prolyl-L-tyrosyl-L-ε-tosyl-lysine methyl ester (see Example 9) are dissolved in 30 ml. of methanol, 30 ml. of a 1 N-solution of caustic soda are added, and the whole is allowed to stand at room temperature for 2 hours. The reaction solution is worked up in the manner described for carbobenzoxy-L-prolyl-L-tyrosyl, and, after the crude product has been triturated with ether, 6.9 grams (98%) of product in the form of a colorless amorphous powder are obtained, having the specific rotation $[\alpha]_D=-33.2°$ (c.=4.76 in alcohol).

EXAMPLE 11

*L-prolyl-L-tyrosyl-L-ε-tosyl-lysine methyl ester*

50 grams (0.07 mol) of carbobenzoxyl-L-prolyl-L-tyrosyl-L-ε-tosyl-lysine-methyl ester (see Example 9) are dissolved in 200 mol of methanol, one equivalent of a solution of hydrogen chloride in methanol is added, and hydrogenation is carried out in the presence of 1.5 grams of palladium charcoal (10% strength) at room temperature under atmospheric pressure, the carbon dioxide formed being absorbed in caustic soda solution. When the calculated quantity of hydrogen has been absorbed, hydrogenation ceases. The catalyst is removed by filtration, and the solution is evaporated in vacuo. The partially crystalline residue is triturated with ethyl acetate. By recrystallizing the product twice from methanol there is obtained the analytically pure tripeptide ester hydrochloride melting at 178–180° C. (by heating up rapidly) or 198–200° C. (by heating up slowly). The product has the specific rotation $[\alpha]_D=-19.4°$ (c.=2.16 in water), and the yield is 37.0 grams (87%).

In order to obtain the free ester 33.5 grams (0.055 mol) of the hydrochloride are suspended in 350 ml. of ethyl acetate, and 30 ml. of a 2.5 N-solution of ammonia in methanol are added and the whole is stirred for 30 minutes at room temperature, during which the starting material completely dissolves. The precipitated ammonium bromide is filtered off and the filtrate is evaporated in vacuo, and the residue is taken up in 100 ml. of ethyl acetate. By allowing the mixture to stand overnight at 0° C. the tripeptide ester precipitates in crystalline form. The yield amounts to 31.3 grams (99%), and the product melts at 82–84° C. After being recrystallized twice a test portion of the product melts at 85–87° C., and has the specific rotation $[\alpha]_D^{26}=-15.8°$ (c.=5.44 in alcohol).

When tested by paper chromatography the hydrochloride and also the free ester are unitary.

EXAMPLE 12

*Tertiary-butyloxycarbonyl-L-prolyl-L-tyrosyl-L-ε-tosyl-lysine methyl ester*

To a solution of 31.3 grams (54 millimols) of freshly prepared L-prolyl-L-tyrosyl-L-ε-tosyl-lysine methyl ester (see Example 11) in 60 ml. of dry pyridine are added 13.1 grams (55 millimols) of tertiary butyl-para-nitrophenyl carbonate and the whole is allowed to stand at 20° C. overnight. The reaction solution is evaporated in vacuo to a small volume, ethyl acetate is added, and, while cooling with ice, the solution is washed three times with 2 N-hydrochloric acid, twice with a 1 N-solution of sodium bicarbonate and with water, dried, and evaporated in vacuo. The residue, after being triturated several times with ether yields 35.5 grams (98%) of a slightly yellowish foam. The product is found to be unitary when examined by paper chromatography (after hydrolysis of the tertiary-butyloxycarbonyl- and ester groups with concentrated hydrochloric acid for 60 minutes at 40° C.) and when subjected to countercurrent distribution by the method of Craig (system methanol-water-chloroform-carbon tetrachloride, 8:2:5:5).

EXAMPLE 13

L-prolyl-L-tyrosyl-L-ε-tosyl-lysine (a) A solution of 6.11 grams (10 millimols) of L-prolyl-L-tyrosyl-L-ε-tosyl-lysine methyl ester hydrochloride (see Example 11) in 40 ml. of 1 N-solution of caustic soda is allowed to stand for one hour at 0° C. and then the pH-value is adjusted to 5 with 1 N-hydrochloric acid. The precipitated material is filtered off and washed with water and alcohol, to yield 4.67 grams (83%) of a product melting at 222–224° C. For further purification the product is dissolved in 20 ml. of hot dimethylformamide, filtered to remove a little insoluble matter, and 50 ml. of hot methanol are added, whereupon the N-tosyl-tripeptide precipitates in the form of fine needles melting at 224–226° C. There are obtained 4.40 grams (79%) of the product having the specific rotation $[\alpha]_D^{27} = -16.6°$ (c.=3.99 in dimethylformamide), and $-36.4°$ (c.=2.36 in 0.5 N-solution of potassium bicarbonate), and the product is unitary when examined by paper chromatography.

(b) 3.47 grams (5 millimols) of carbobenzoxy-L-prolyl-L-tyrosyl-L-ε-tosyl-lysine (see Example 10) are dissolved in 35 ml. of methanol and hydrogenated in the presence of 0.5 gram of palladium-charcoal of 10% strength, the carbon dioxide being absorbed in caustic soda solution. When the calculated quantity of hydrogen has been absorbed, the precipitated reaction product is dissolved by the addition of 20 ml. of hot water, the solution is filtered hot to remove the catalyst, the filtrate is evaporated in vacuo and the crystalline residue is washed with alcohol. The yield amounts to 1.90 grams (68%) melting at 219–222° C. After recrystallization from a mixture of dimethylformamide and methanol the product obtained is identical with that obtained under (a) above.

EXAMPLE 14

Tert.-butyloxycarbonyl-L-prolyl-L-tyrosyl-L-ε-tosyl-lysine 34.0 grams (50 millimols) of tertiary-butyloxycarbonyl-L-prolyl-L-tyrosyl-L-ε-tosyl-lysine-methyl ester (see Example 12) are dissolved in a mixture, cooled to 10° C., of 50 ml. of methanol and 150 ml. of a 1 N-solution of caustic soda. The reaction mixture is allowed to stand for one hour at room temperature, adjusted to a pH value of 7 with 2 N-hydrochloric acid, freed from methanol in vacuo, and the residue is covered with ethyl acetate and acidified at 0° C., while shaking, with 2 N-hydrochloric acid. The ethyl acetate phase is separated, washed with water, and extracted three times with 0.5 N-solution of potassium bicarbonate. After covering the purified aqueous extracts with ethyl acetate they are rendered weakly acid to Congo at 0° C. with 2 N-hydrochloric acid, and the ethyl acetate solution is washed with water until the washings are neutral, dried, and evaporated in vacuo. The foam obtained as residue yields, after trituration with ether, 32.2 grams (96%) of a colorless powder which is unitary when examined by paper chromatography (after hydrolysis of the protective groups).

For the purpose of analysis a test portion is dissolved in a small amount of ethyl acetate at 30° C., the solution is cooled to 0° C., the oil which separates is separated from the supernatent solution by decantation, and then triturated with ether. Trituration with an 0.1 N-solution of caustic soda in methanol yields the expected equivalent weight of 660.

EXAMPLE 15

Tertiary-butyloxycarbonyl-L-prolyl-L-tyrosyl-L-ε-tosyl-lysyl-L-methionine methyl ester A solution of 33.0 grams (50 millimols) of tertiary-butyloxycarbonyl-L-prolyl-L-tyrosyl-L-ε-tosyl-lysine (see Example 14) and 9.0 grams (55 millimols) freshly prepared L-methionine-methyl ester in 250 ml. of acetonitrile is cooled to $-10°$ C. and 11.4 grams (55 millimols) of dicyclohexyl-carbodiimide are added. After 15 minutes at $-5°$ C. and 24 hours at 0° C., one ml. of glacial acetic acid is added, the precipitated dicyclohexyl-urea is filtered off, and the filtrate is evaporated in vacuo. The residue is taken up in ethyl acetate, washed while cooling with ice with 1 N-hydrochloric acid, and 0.5 N-solution of potassium bicarbonate and water, dried, evaporated in vacuo, and the material obtained in the form of an oil is triturated with ether. The yellowish amorphous powder 38.3 grams (95%) when examined by paper chromatography (after hydrolysis of the protective groups) contains about 10% of impurities, which cannot be separated by countercurrent distribution by the method of Craig (system methanol, water, chloroform, carbon tetrachloride, 12:3:4:8).

In the same manner there is obtained by reaction with L-methionine-para-nitrobenzyl ester [obtained from carbobenzoxy-L-methionine-para-nitrobenzyl ester, melting at 62–64° C. and having the specific rotation $[\alpha]_D = -15°$ (c.=2.02 in acetone) by decarbobenzyloxylation with hydrogen bromide in ethyl acetate followed by conversion of the L-methionine-para-nitrobenzyl ester hydrobromide melting at 149–151° C. and having the specific rotation $[\alpha]_D^{30} = +4°$ (c.=1.97 in methanol) into the free ester] tertiary-butyloxycarbonyl-L-prolyl-L-tyrosyl-L-ε-tosyl-lysyl-L-methionine-para-nitrobenzyl ester in 96% yield as a yellowish foam, which has a degree of purity corresponding to that of the above described methyl ester.

EXAMPLE 16

Tertiary-butyloxycarbonyl-L-prolyl-L-tyrosyl-L-ε-tosyl-lysyl-L-methionine 20.1 grams (25 mmol.) of tertiary butyloxycarbonyl-L-prolyl-L-tyrosyl-L-ε-tosyl-lysyl-L-methionine-methyl ester (see Example 15) are dissolved in 40 ml. of methanol, 75 ml. of a 1 N-solution of caustic soda are added at 10° C., and the whole is allowed to stand at room temperature for 45 minutes. By working up in the manner described for tertiary butyloxy-carbonyl-L-prolyl-L-tyrosyl-L-ε-tosyl-lysine the crude product obtained as a foam when triturated with ether yields 15.4 grams (78%) of a slightly yellowish powder, which is further worked up directly. It has an equivalent weight of 824 (calculated 791).

The same product is formed by hydrolysing the corresponding para-nitrobenzyl ester (yield 83%).

EXAMPLE 17

L-prolyl-L-tyrosyl-L-ε-tosyl-lysyl-L-methionine 15.0 grams (19 millimols) of tertiary butyl oxycarbonyl -L - prolyl - L - tyrosyl - L - ε - tosyl - lysyl - L - methionine (see Example 16) are dissolved in 75 ml. of hot ethyl acetate, and the solution is cooled to room temperature and poured into 300 ml. of a 2.5 N-solution of hydrogen chloride in ethyl acetate, while shaking. After one minute an initially oily and subsequently crystallizing material begins to separate, and the latter is filtered off after 30 minutes, and washed with ethyl acetate and ether. The somewhat hygroscopic hydrochloride (12.6 grams), for the purpose of conversion into the free tetrapeptide derivative, is dissolved in 50 ml. of water and adjusted to a pH-value of 6 with 1 N-ammonium hydroxide solution. The oily material that separates is solidified by triturating it at 0° C. and is separated by centrifuging. After washing several times with water the moist amorphous product is triturated with 50 ml. of hot alcohol, and the finely crystalline material is filtered off after 2 hours and washed with alcohol. The yield amounts to 8.9 grams (75%) of a product melting at 208–211° C. For further purification the product is dissolved in 150 ml. of hot dimethyl-formamide and 300 ml. of methanol are added. The tetrapeptide derivative separates out rapidly in the form of fine needles melting at 229–231° C., and, after isolating a second fraction from the mother liquor, the yield amounts to 8.65 grams (66%) of a product having the specific rotation $[\alpha]_D^{26} = -42° \pm 0.2°$ (c.=2.02 in an 0.5 N-solution of potassium carbonate). The purified product has the expected values upon analysis, but contains about 5% of byproduct which is detectable by paper chromatography.

The same product is obtained by treating tertiary-butyl-oxycarbonyl - L - prolyl - L - tyrosyl - L - ε - tosyl - lysyl-L-methionine para-nitrobenzyl ester with hydrogen chloride in ethyl acetate (yield 71%) and hydrolysing the resulting L - prolyl - L - tyrosyl-L-ε-tosyl-lysyl-L-methionine para-nitrobenzyl ester hydrochloride (yield 60%).

EXAMPLE 18

*Carbobenzoxy-L-asparaginyl-L-seryl-glycyl-L-prolyl-L-tyrosyl-L-ε-tosyl-lysyl-L-methionine*

A solution of 1.03 grams (2.5 millimols) of carbobenzoxy-L-asparaginyl-L-seryl-glycine (see Example 6) and 0.38 ml. (0.28 millimols) of triethylamine in 5 ml. of triethylamine in 5 ml. of dimethylformamide is cooled to 10° C. with the exclusion of moisture, and a solution of 0.35 gram (2.5 millimols) of isobutyl chlorocarbonate in 2 ml. of tetrahydrofurane is added dropwise in the course of 5 minutes, while stirring. The solution is stirred for a further 10 minutes at −10° C. and for 20 minutes at 20° C., then cooled to 0° C., and a solution of 1.73 grams (2.5 millimols) of L-prolyl-L-tyrosyl-L-ε-tosyl-lysyl-L-methionine (see Example 17) and 0.41 ml. (3 millimols) of triethylamine in 15 ml. of dimethylformamide (the solution being prepared by heating in a closed vessel at about 120° C. and cooling rapidly) is added dropwise in the course of 10 minutes. The reaction mixture is allowed to stand for one hour at 0° C. and overnight at room temperature, and then it is concentrated to about 4 ml. under 0.1 mm. pressure and mixed with 20 ml. of 1 N-acetic acid. The oily material that separates out is washed several times with 1 N-acetic acid and water, whereby it partially solidifies, and is then dried in vacuo at room temperature. It is recrystallized twice from alcohol to yield 1.25 grams (46%) of an amorphous product melting at 167–172° C., which contains 10% of an impurity detectable by paper chromatography. For further purification the product is distributed in a Craig apparatus in the system methanol, water, chloroform, carbon tetrachloride, 3:1:3:1 in 60 stages each consisting of 10 ml. of lower phase and upper phase (maximum at G=0.63). The combined peak fractions yield, after recrystallization from methanol, 0.54 gram of a product melting at 175–177° C. (slight sintering at 171° C.), which is unitary according to paper chromatography, has the specific rotation $[\alpha]_D^{26} = -30.1°$ (c.=2.06 in dimethylformamide).

By reacting carbobenzoxy-L-asparaginyl-L-seryl-glycine (see Example 6) with L-prolyl-L-tyrosyl-L-ε-tosyl-lysine (see Example 13) in the same manner there is obtained carbobenzoxy - L-asparaginyl-L-seryl-glycyl-L-prolyl-L-tyrosyl-L-ε-tosyl-lysine, which after being recrystallized twice from alcohol yields a product melting at 138–143° C. (slight sintering at 133° C.), which is pure according to paper chromatography, and has the specific rotation $[\alpha]_D = -31.1°$ (c.=2.16 in dimethylformamide). When subjected to hydrogenolytic decarbobenzoxylation the product yields L-asparaginyl-L-seryl-glycyl-L-prolyl-L-tyrosyl-L-ε-tosyl-lysine. After recrystallization from a mixture of dimethylformamide and methanol it melts at 192–196° C. (brown coloration at 180° C.).

EXAMPLE 19

*$N^\alpha$-carbobenzyloxy-N-ε-tosyl-L-lysyl-L-asparaginic acid dimethyl ester*

45.0 grams (0.28 mol) of L-asparaginic acid dimethyl ester and 126 grams (0.29 mol) of $N^\alpha$-carbobenzyloxy-N-ε-tosyl-L-lysine are dissolved in 1.5 liters of acetonitrile. The solution is cooled to −15° C., and 60.0 grams (0.29 mol) of dicyclohexyl-carbodiimide are added and the whole is allowed to stand for 30 minutes at −15° C. and 48 hours at 3° C. The crystalline magma which separates (a mixture of the dipeptide dimethyl ester and dicyclohexyl-urea) is filtered off with suction. It amounts to 203.5 grams and is worked up as described below. The filtrate is mixed with 2 ml. of glacial acetic and the mixture is allowed to stand for 2 hours at 3° C., and is then evaporated and the residue is taken up in ethyl acetate. After washing the solution with dilute hydrochloric acid, water, sodium bicarbonate solution and water, then drying and evaporating it there are obtained 35.0 grams of residue. Crystallization of the residue from ethyl acetate yields 11.8 grams of the above compound melting at (130° C.) 137–140° C. By subjecting the mother liquor of these crystals to chromatography over aluminum oxide there is obtained a byproduct melting at 122–124° C. It is 1-($N^\alpha$-carbobenzyloxy-N-ε-tosyl-L-lysyl)-1:3-dicyclohexyl-urea.

The mixture (203.5 grams) of the aforesaid dipeptide ester and dicyclohexyl-urea that separates from the reaction solution is triturated with cold chloroform, and the undissolved urea is filtered off with suction (57.5 grams melting at 222–225° C.) The filtrate is evaporated and the residue is crystallized from methanol, whereby 136.8 grams of $N^\alpha$ - carbobenzyloxy-N-ε-tosyl-L-lysyl-L-asparaginic acid dimethylester are obtained melting at (140° C.) 144–146° C. The total yield amounts to 148.6 grams (92% of the theoretical yield).

By recrystallizing the product from ethyl acetate and then methanol there is obtained the analytically pure product melting at 144–146° C. having the specific rotation $[\alpha]_D = +27° \pm 0.6°$ (c.=1.11 in chloroform).

EXAMPLE 20

*N-ε-tosyl-L-lysyl-L-asparaginic acid dimethyl ester*

50.0 grams (0.087 mol) of $N^\alpha$-carbobenzyloxy-N-ε-tosyl-L-lysyl-L-asparaginic acid dimethyl ester (see Example 19) are dissolved in 200 ml. of absolute glacial acetic acid with the exclusion of moisture, 90 ml. of a 4.2 N-solution of hydrogen bromide in glacial acetic acid are added, and the whole is allowed to stand at room temperature until the evolution of gas ceases (2½ hours). The reaction solution is then evaporated to dryness under 0.1 mm. pressure of mercury and at a bath temperature of 35° C., and the residue is triturated with ethyl acetate, while cooling with ice, until it crysatllizes throughout. There are obtained 44.37 grams (97% of the theoretical yield) of crude crystalline N-ε-tosyl-L-lysyl-L-asparaginic acid dimethyl ester hydrobromide melting at (140° C.) 142–146° C. The product is sufficiently pure for use in the further reactions. By recrystallizing it twice from a mixture of methanol and ether an analytically pure product melting at 144–146° C. is obtained, which has the specific rotation $[\alpha]_D = +7.0° \pm 0.3°$ (c.=2.14 in methanol).

44.0 grams (0.084 mol) of N-ε-tosyl-L-lysyl-L-asparaginic acid dimethyl ester hydrobromide are dissolved in 120 ml. of water, the solution is clarified by filtration, a large quantity of chloroform is added, and the mixture is rendered strongly alkaline with a cold concentrated solution of potassium carbonate, while cooling with ice. The free peptide ester which separates out as an oil is taken up in chloroform, the chloroform solution is washed twice with a small amount of cold sodium sulfate solution, dried and evaporated. There are obtained 33.0 grams (89%) of N-ε-tosyl-L-lysyl-L-asparaginic acid dimethyl ester in the form of a clear viscous oil, and the product is immediately further worked up in the manner described below.

EXAMPLE 21

*N-carbobenzyloxy-L-prolyl-N-ε-tosyl-L-lysyl-L-asparaginic acid dimethyl ester*

17.0 grams (0.082 mol) of dicyclohexyl-carbodiimide are added to a solution, cooled to −15° C., of 33.0 grams (0.075 mol) on N-ε-tosyl-L-lysyl-L-asparaginic acid dimethyl ester (see Example 20) and 20.4 grams (0.082 mol) of N-carbobenzyloxy-L-proline in 500 ml. of acetonitrile. After maintaining the mixture for 30 minutes at −15° C. and 20 hours at 3° C., the dicyclohexyl-urea is filtered off with suction (16.4 grams melting at 223–226° C.), and the filtrate, after the addition of 2 ml. of glacial acetic acid, is allowed to stand for a further 2 hours at 3° C. In this manner a further 0.98 gram of dicyclohexyl-urea separates out. The filtrate is evaporated, and the residue is dissolved in ethyl acetate, and the solution is washed with dilute hydrochloric acid, water, sodium bicarbonate solution and water, and dried and evaporated. The residue (50.0 grams) is triturated several times with a large amount of ether. (The ether-soluble portion (8.0 grams of resin) is worked up as described below.) The ether-insoluble material (41.7 grams) yields, after standing for a long time in a mixture of methanol and water, 35.0 grams of N-carbobenzyloxy-L-prolyl-N-ε-tosyl-L-lysyl-L-asparaginic acid dimethyl ester in the form of needles melting at (96° C.) 110–113° C. By recrystallization from a mixture of acetone and ether and from methanol there is obtained an analytically pure product melting at 126–129° C. having the specific rotation $[\alpha]_D = -22.6°$ ±0.8° (c.=1.02 in chloroform).

The mother liquors from the crude crystallizate (35.0 grams) are combined with the above ether-soluble material (8.0 grams) (total 13.2 grams), and are chromatographed over 50 times the weight of silica gel. The fractions eluted with a mixture of chloroform and methanol give a further 7.0 grams of crystalline tripeptide ester melting at about 120–126° C.

A total of 42.0 grams (83%) of crystalline tripeptide derivative are obtained.

EXAMPLE 22

*N-carbobenzyloxy-L-prolyl-N-ε-tosyl-L-lysyl-L-asparaginic acid diamide*

The tripeptide derivative of Example 21 is allowed to stand with a large excess of ammonia in methanol for 48 hours at room temperature. By evaporation and crystallization from methanol N-carbobenzyloxy-L-prolyl-N-ε-tosyl-L-lysyl-L-asparaginic acid diamide is obtained in a yield of 85%, which melts at 196–202° C. and has the specific rotation $[\alpha]_D = -20.8°$ ±0.70° (c.=1.30 in dimethylformamide).

EXAMPLE 23

*L-prolyl-N-ε-tosyl-L-lysyl-L-asparaginic acid dimethyl ester*

2.00 grams (2.97 millimols) of N-carbobenzyloxy-L-prolyl-N-ε-tosyl-L-lysyl-L-asparaginic acid dimethyl ester (see Example 21) are dissolved in 25 ml. of methanol, 2 ml. of a 2 N-solution of hydrogen chloride in methanol are added, and the solution is hydrogenated in the presence of 100 mg. of palladium-charcoal (10% of palladium) at room temperature under atmospheric pressure. The carbon dioxide evolved is simultaneously absorbed in caustic soda solution. The hydrogenation ceases after the absorption of somewhat less than the calculated quantity of hydrogen, after 5 hours. The catalyst is filtered off and the filtrate evaporated to yield the hydrochloride of the above tripeptide dimethyl ester (1.66 grams) in the form of a colorless resin. In order to convert the latter into the free base the hydrochloride is dissolved in a small amount of water, and the clear aqueous solution is covered with a large quantity of ethyl acetate, and the mixture is rendered strongly alkaline by the addition of cold concentrated potassium carbonate solution at about 5° C., while cooling. The reaction product separates out in an oily form, and dissolves in ethyl acetate upon shaking. The ethyl acetate solution is washed with cold sodium sulfate solution, dried and evaporated. The L-prolyl-N-ε-tosyl-L-lysyl-L-asparaginic acid dimethyl ester (1.27 grams) obtained as a colorless resin is used immediately for the further reactions.

EXAMPLE 24

*L-prolyl-N-ε-tosyl-L-lysyl-L-asparaginic acid diamide*

The N-carbobenzyloxy-L-prolyl-N-ε-tosyl-L-lysyl-L-asparaginic acid diamide described in Example 22 yields under the conditions of hydrogenation described in Example 23, L-prolyl-N-ε-tosyl-L-lysyl-L-asparaginic acid diamide hydrochloride melting at 236–238° C. (after recrystallization from a mixture of water and acetone) and having the specific rotation $[\alpha]_D = -37.9°$ ±1.2° (c.=1.08 in water). The free base is obtained from the hydrochloride by distribution between n-butanol and a 2 N-solution of sodium carbonate. The butanol solution is evaporated and the residue is triturated with ether to yield L-prolyl-N-ε-tosyl-L-lysyl-L-asparaginic acid diamide in the form of a colorless powder melting at 117–135° C. and having the specific rotation $[\alpha]_D = -40.4°$ ±0.6° (c.=1.09 in water).

EXAMPLE 25

*N-carbobenzyloxy-L-prolyl-L-prolyl-N-ε-tosyl-L-lysyl-L-asparaginic acid dimethyl ester*

9.40 grams of dicyclohexyl-carbodiimide (0.0455 mol) are added to a solution of 20.50 grams (0.038 mol) of L-prolyl-N-ε-tosyl-L-lysyl-L-asparaginic acid dimethyl ester (see Example 23) and 11.35 grams (0.0455 mol) of N-carbobenzyloxy-L-proline in 300 ml. of acetonitrile at −15° C. The reaction solution is then allowed to stand for one hour at −15° C. and for 24 hours at 3° C. After filtering off the dicyclohexyl-urea (7.77 grams=99% of the theoretical yield), 1 ml. of glacial acetic acid is added to the filtrate and the whole is allowed to stand for one hour at 3° C. In this manner a further 100 mg. of urea separate out. The filtrate is evaporated, the residue is taken up in ethyl acetate and the solution is washed in the usual manner until the washings are neutral. The ethyl acetate solution is evaporated to yield 28.44 grams of residue (resin). The crude product is triturated several times with a large amount of ether and the ether-insoluble portion (24.29 grams) is subjected to counter-current distribution. The 78-stage distribution between 80% of methanol and a mixture of chloroform and carbon tetrachloride (1:1) yields 17.0 grams of pure tetrapeptide derivative (distribution number G=7.351) in the form of a colorless resin having the specific rotation $[\alpha]_D = -70.6°$ ±1° (c.=2.09 in methanol).

EXAMPLE 26

*L-prolyl-L-prolyl-N-ε-tosyl-L-lysyl-L-asparaginic acid dimethyl ester*

10.00 grams (12.95 millimols) of N-carbobenzyloxy-L-prolyl-L-prolyl-N-ε-tosyl-L-lysyl-L-asparaginic acid dimethyl ester (see Example 25) are dissolved in 200 ml. of methanol, 10 ml. of a 2 N-methanolic solution of hydrogen chloride are added, and the solution is hydrogenated in the presence of 500 mg. of palladium-charcoal (10% palladium) at room temperature under atmospheric pressure, a second hydrogenation vessel containing caustic soda solution being used to absorb the carbon dioxide evolved. When the calculated quantity of hydrogen has been absorbed the solution is filtered to remove the catalyst and evaporated. The hydrochloride of the above tetrapeptide ester is obtained as a colorless resin. The product is converted, in the manner described in Example 23, into the free L-prolyl-L-prolyl-N-ε-tosyl-L-lysyl-L-asparaginic acid dimethyl ester. The yield is 6.86 grams (83%), and the product obtained as a colorless resin is used directly for the further reaction.

EXAMPLE 27

*N-carbobenzyloxy-L-seryl-L-prolyl-L-prolyl-N-ε- tosyl-L-lysyl-L-asparaginic acid dimethyl ester*

6.86 grams (10.8 millimols) of L-prolyl-L-prolyl-N-ε-tosyl-L-lysyl-L-asparaginic acid dimethyl ester (see Example 26) are dissolved in 150 ml. of acetonitrile, and 2.61 grams of N-carbobenzyloxy-L-serine (12.0 millimols) are added. The solution is cooled to −15° C., 2.47 grams of dicyclohexyl-carbodiimide are added, and the whole is allowed to stand for one hour at −15° C. and for 60 hours at 3° C. The mixture is then filtered with suction to remove the precipitated dicyclohexyl-urea (2.33 grams, corresponding to 91% of the theoretical yield) and the filtrate is evaporated. The residue is dissolved in ethyl acetate, and the solution is washed in the usual manner until the washings are neutral. The ethyl acetate solution yields 9.06 grams of residue. The latter is triturated with a large quantity of petroleum ether and then with ether. The ether-insoluble crude product (8.35 grams) is subjected to countercurrent distribution for the purpose of purification. The 48-stage distribution between 80% of methanol and a mixture of chloroform and carbon tetrachloride (1:1) yields 84% of pure pentapeptide ester as a colorless resin (distribution number G=0.507). After trituration with ether, the analytically pure product melts at about 70–105° C. and has the specific rotation $[\alpha]_D = -92.0° \pm 0.6°$ (c.=2.16 in methanol).

EXAMPLE 28

*L-seryl-L-prolyl-L-prolyl-N-ε-tosyl-L-lysyl-L-asparaginic acid dimethylester*

8.00 grams (9.33 millimols) of N-carbobenzyloxy-L-seryl - L - prolyl - L - prolyl - N - ε - tosyl - L - lysyl - L-asparaginic acid dimethyl ester (see Example 27) are dissolved in 200 ml. of methanol, 4 ml. of 3.3 N-methanolic hydrogen chloride are added and the solution is hydrogenated in the presence of 500 mg. of palladium-charcoal (10% of palladium) at room temperature under atmospheric pressure, the carbon dioxide being absorbed in caustic soda solution. The hydrogenation is complete after 4½ hours and the absorption of somewhat more than the calculated quantity of hydrogen. By filtering the mixture to remove the catalyst and evaporating the filtrate, the hydrochloride of the above pentapeptide ester is obtained as a colorless resin. Repeated precipitation from acetone solution with ether yields 6.53 grams of an amorphous powder melting at 110–150° C. having the specific rotation $[\alpha]_D = -86.7° \pm 0.7°$ (c.=2.41 in methanol).

In order to prepare the free pentapeptide ester 5.00 grams (6.58 millimols) of the above hydrochloride are distributed between 500 ml. of chloroform and 50 ml. of a 2 N-solution of sodium carbonate. The reaction product is dissolved in chloroform. The chloroform extract is washed twice with cold sodium sulfate solution, the sodium carbonate solution and sodium sulfate solution are washed with a further 200 ml. of chloroform, and the combined chloroform solutions yield, after being dried and evaporated, 4.00 grams (84%) of L-seryl-L-prolyl - L - prolyl - N - ε - tosyl - L - lysyl - L - asparaginic acid dimethyl ester in the form of a colorless resin, which is immediately used for further reaction.

EXAMPLE 29

*N - carbobenzyloxy - L - glutaminyl - L - histidyl - L-phenylalanyl - L - arginyl - L - tryptophyl - glycyl - L-seryl - L - prolyl - L - prolyl - ε - tosyl - L - lysyl - L-asparaginic acid dimethyl ester hydrochloride*

1.36 grams (1.4 millimols) of carbobenzyloxy-L-glutaminyl - L - histidyl - L - phenylalanyl - L - arginyl - L-tryptophyl-glycine (see Indian patent application No. 64,681, Example 32) are dissolved in 16 ml. of freshly distilled dimethyl formamide at a raised temperature, the solution is cooled to room temperature, and 1.6 grams (2.1 millimol) of L-seryl-L-prolyl-L-prolyl-ε-tosyl-L-lysine-asparaginic acid dimethyl ester hydrochloride (see Example 28) are added, and the whole is then stirred at room temperature. After stirring the mixture for 2 hours there is obtained a clear solution. 590 milligrams (2.9 millimols) of dicyclohexyl-carbodiimide in 3.5 ml. of dimethyl-formamide are added and the whole is allowed to react for 3 days at room temperature.

The solution is freed from dicyclohexyl-urea and there are added 500 ml. of ethyl acetate, the precipitated material is removed by a filtration through a fine glass frit, and by drying under a high vacuum at 40° C. there are obtained 2.3 grams of a crude product which is still contaminated with starting material.

The latter 2.3 grams of crude product are purified by multiplicative distribution in 60 stages between the phases, n-butanol:1% acetic acid=1:1 (G=0.8).

The greater part of the protected, paper chromatographically pure carbobenzoxy-undecapeptide dimethyl ester hydrochloric is present in the elements 15–30. These fractions are combined and evaporated to dryness, and precipitated twice from a small amount of dimethyl-formamide with a large quantity of ethyl acetate.

The yield amounts to 1.34 grams, 60% of the theoretical yield of an amorphous white powder having the specific rotation $[\alpha]_D^{25} = -53.8° \pm 1.8°$ (c.=0.9475 in dimethylformamide).

In the three systems:

Tertiary amyl alcohol:isopropanol:water=100:40:55
Secondary butanol:isopropanol:monochloracetic acid:water=70:10:3g:40
Secondary butanol:isopropanol:5% veronal-Na:water=100:15:10:60 the protected ester exhibits the following $R_f$-values (average values): 0.55, 0.62 and 0.67, respectively.

Quantitative amino-acid determination by the method of Stein and Moore on a column of Amberlite XE–69 gives the expected amino-acid ratio.

EXAMPLE 30

*L - glutaminyl - L - histidyl - L - phenylalanyl - L - arginyl-L - tryptophyl - glycyl - L - seryl - L - prolyl - L - prolyl-ε - tosyl - L - lysyl - L - asparaginic acid dimethyl ester trihydrochloride*

1.25 grams (0.72 millimols) of carbobenzoxy-undecapeptide dimethyl ester hydrochloride (cf. Example 29) are agitated with hydrogen in 70 ml. of methanol, which contains 2.2 equivalents of hydrogen chloride gas, in the presence of 200 mg. of palladium-charcoal catalyst of 10% strength. In order to absorb the carbon dioxide formed a second hydrogenating vessel containing concentrated caustic potash solution is interposed. After 6 hours the absorption of hydrogen ceases. The methanolic solution is freed from catalyst, the solvent is evaporated at 40° C. in vacuo, and the residue is reprecipitated once from a mixture of absolute methanol and ether.

By drying the product there are obtained 1.19 grams of the amorphous slightly pink trihydrochloride of the undecapeptide diester.

The compound exhibits in the three chromatographic systems described in Example 29 only a single Paulyand ninhydrin-positive spot, and the following $R_f$-values (average values) 0.57, 0.68 and 0.71 respectively.

EXAMPLE 31

*Carbobenzyloxy - L - asparaginyl - L - seryl - glycyl - L-prolyl - L - tyrosyl - ε - tosyl - L - lysyl - L - methionyl-L - glutaminyl - L - histidyl - L - phenylalanyl - L-arginyl - L - tryptophyl - glycyl - L - seryl - L - prolyl-L - prolyl - (ε - tosyl) - L - lysyl - asparaginic acid dimethyl ester hydrochloride*

210 milligrams (0.128 millimol) of the undecapeptide dimethyl ester trihydrochloride (see Example 30) are dissolved in 2 ml. of freshly distilled dimethyl formamide, 0.28 ml. of a 1 N-solution of triethylamine in dimethylformamide is added at 0° C. and the whole is allowed to stand for 2 hours at 0° C. Triethylamine hydrochloride slowly separates out. After about 90 minutes the separation of salt ceases. There are then added 152 mg (0.14 millimol) of carbobenzoxy-L-asparaginyl-L - seryl - glycyl - L - prolyl - tyrosyl - ε - tosyl - L - lysyl-L-methionine (see Example 18), and, after a further 15 minutes, 0.21 ml. of a 1 N-solution of dicyclohexyl-carbodiimide in diethylformamide is added. The whole is allowed to react for 3 days at 0° C. and for one day at room temperature, then the mixture is filtered to remove the dicyclohexyl urea that has separated, and a precipitate is produced with 60 ml. of ethyl acetate. By drying the precipitate in a high vacuum at 40° C. there are obtained 290 mg. of an amorphous white powder.

Paper chromatography shows that the carbobenzyloxy-L - asparaginyl - L - seryl - glycyl - L - prolyl - L -tyrosyl - ε - tosyl - L - lysyl - L - methionyl - L - glutaminyl-L - histidyl - L - phenylalanyl - L - arginyl - L - tryptophyl - glycyl - L - seryl - L - prolyl - L - prolyl - (ε - tosyl)-L-lysyl-asparaginic acid dimethyl ester hydrochloride contains considerable amounts of starting material.

For purification 360 mg. of crude material (from two identical batches) are chromatographed on a cellulose column (2.5 cm. in diameter and 90 cm. long) with n-butanol saturated with 1% of acetic acid. The speed of elution is 3–4 ml. every 20 minutes. Fractions 81–175 show the Pauly-positive reaction.

Fractions 82–84, 86–93, 94–122, 123–132 and 133–175 are united. Fractions 85–93 consist of a mixture of carbobenzoxy-heptapeptide and carbobenzoxy-octadecapeptide ester, whereas fractions 94–122 contain the pure protected octadecapeptide ester, and the greater part of the undecapeptide ester is present in the remaining fractions.

The combined fractions 94–122 yield 113 mg. of white amorphous powder, which yield in paper chromatography only one Pauly-positive and one Ehrlich-positive spot.

A test portion of the purified protected peptide ester is hydrolysed with 6 N-hydrochloric acid for 15 hours at 105° C., and, after separation by electrophoresis and paper chromatography, gives the expected ninhydrin-positive amino-acid spots.

EXAMPLE 32

*L - asparaginyl - L - seryl - glycyl - L - prolyl - L - tyrosyl - L - lysyl - L - methionyl - L - glutaminyl - L - histidyl - L - phenylalanyl - L - arginyl - L - tryptophyl-glycyl - L - seryl - L - prolyl - L - prolyl - L - lysyl - L-asparaginic acetate*

400 mg. (0.15 millimol) of protected octadecapeptide-dimethyl ester hydrochloride (cf. Example 31) are dissolved in 8 ml. of 75% dioxane and, in an atmosphere of nitrogen, treated at room temperature in the course of 14 minutes with 0.4 ml. of 0.46 N-barium hydroxide solution (pH 11.4). The saponification solution is neutralized with 1.84 ml. of 0.1 N-sulfuric acid, and the solvent evaporated at 40° C. under reduced pressure.

The residue is taken up in 10 ml. of 50% dioxane, the insoluble barium sulfate is separated by means of a fine sintered glass plate and washed twice more with 5 ml. of 50% dioxane. On evaporation under reduced pressure at 40° C. and drying the residue over phosphorus pentachloride in a high vacuum, 385 mg. of saponification product are obtained.

These 385 mg. are dissolved in 80 ml. of liquid ammonia which has been dried over sodium, and reduced with calcium at the boiling temperature of the ammonia. After 110 mg. of calcium have been added, the solution remains dark blue for about 10 minutes. The reaction mixture is then admixed with much ammonium bicarbonate, after which the blue coloration slowly disappears and the reaction solution retains a milky color. The ammonia is evaporated at room temperature and the last traces are expelled in a high vacuum over sulfuric acid.

The residue is repeatedly extracted with N-ammonium bicarbonate solution (3 times 10 ml.) and twice with 5 ml. of water, filtered through Cellite, the clear aqueous solution (pH=8.4) is given a pH of 4.2 with glacial acetic acid, and the water evaporated at 40° C. in vacuo. The residue is evaporated 5 times with 10 ml. of water, and the ammonium acetate finally sublimed at 40° C. in a high vacuum.

For further purification the crude octadecapeptide is distributed between secondary butanol and 0.5% aqueous trichloracetic acid in the proportion 1:1 over 160 stages.

Determination of the optical density of the various fractions at 277 mμ shows that the bulk of the octadecapeptide is in elements 49–65. The distribution coefficient is 0.53.

The phases of elements 49–54, 55–60, and 61–65 are combined and evaporated to a small volume under reduced pressure at 40° C. To eliminate the trichloracetic acid, the three fractions are passed through a column of 10 ml. of Amberlite IR–4B (acetate form) and the peptide is eluted with 25 ml. of water. The three fractions yield 100 mg. of octadecapeptide acetate.

What is claimed is:

1. A member of the group consisting of the octadecapeptide of the formula L-asparaginyl-L-seryl-glycyl-L-prolyl - L - tyrosyl - L - lysyl - L - methionyl - L - glutaminyl - L - histidyl - L - phenylalanyl - L - arginyl - L-tryptophyl - glycyl - L - seryl - L - prolyl - L - prolyl - L-lysyl-L-aspartic acid and L-asparaginyl-L-seryl-glycyl-L-prolyl - L - tyrosyl - L - lysyl - L - methionyl - L - glutamyl - L - histidyl - L - phenylalanyl - L - arginyl - L-tryptophyl - glycyl - L - seryl - L - prolyl - L - prolyl - L-lysyl - L - aspartic acid.

2. Esters of the octadecapeptides as claimed in claim 1 with alcohols selected from the group consisting of lower alkanols, benzyl alcohol and p-nitrobenzyl alcohol.

3. Derivatives of the octapeptides as claimed in claim 1 in which the free amino groups of the asparaginyl radical and the lysine radicals are protected.

4. Derivatives of the octadecapeptides as claimed in claim 1 in which the amino groups of the lysine radicals are protected by a tosyl group.

5. Derivatives of the octadecapeptides as claimed in claim 1 in which the amino group of the L-asparaginyl radical is protected by a carbobenzoxy group.

6. Salts of the compounds claimed in claim 1 with non-toxic acids.

7. A member of the group consisting of the undecapeptide of the formula L-glutaminyl-L-histidyl-L-phenylalanyl - L - arginyl - L - tryptophyl - glycyl - L - seryl - L-prolyl - L - prolyl - L - lysyl - L - aspartic acid and L - glutamyl - L - histidyl - L - phenylalanyl - L - arginyl - L-tryptophyl - glycyl - L - seryl - L - prolyl - L - prolyl - L-lysyl-L-aspartic acid.

8. Esters of the compounds claimed in claim 7 with alcohols selected from the group consisting of lower alkanols, benzyl alcohol and p-nitrobenzyl alcohol.

9. Derivatives of the compounds claimed in claim 7 in which the free amino groups are protected.

10. The octadecapeptide of the formula L-asparaginyl-L - seryl - glycyl - L - prolyl - L - tyrosyl - L - lysyl - L-methionyl - L - glutaminyl - L - histidyl - L - phenylalanyl - L - arginyl - L - tryptophyl-glycyl - L -seryl - L-prolyl-L-prolyl-L-lysyl-L-aspartic acid.

11. The undecapeptide of the formula L-glutaminyl-L - histidyl - L - phenylalanyl - L - arginyl - L - tryptophyl - glycyl - L - seryl - L - prolyl - L - prolyl - L - lysyl-L-asparaginic acid.

References Cited by the Examiner
UNITED STATES PATENTS
3,040,017  6/1962  Schwyzer et al. ____ 260—112.5

OTHER REFERENCES

Harris et al., "Nature," 178, page 90 (1956).

Hoffman, Jour. Am. Chem. Soc., vol. 79, pp. 1636–41; 6087–88 (1957).

Sheehan et al., "J.A.C.S.," 77, pages 1067–68 (1955).

LEWIS GOTTS, *Primary Examiner.*

CHARLES B. PARKER, LEON ZITVER, *Examiners.*